US009276629B2

(12) United States Patent
Clevorn et al.

(10) Patent No.: US 9,276,629 B2
(45) Date of Patent: Mar. 1, 2016

(54) RAKE RECEIVER CIRCUIT AND METHOD FOR OPERATING A RAKE RECEIVER CIRCUIT

(75) Inventors: Thorsten Clevorn, Duesseldorf (DE);
Herbert Dawid, Herzogenrath (DE);
Edgar Bolinth, Korschenbroich (DE);
Markus Jordan, Gelsenkirchen (DE);
Rajarajan Balraj, Duesseldorf (DE);
Jean-Xavier Canonici, Cannes (FR);
Salim Umer, Antibes (FR); Fabrice Gesbert, Antibes (FR); Georg Diernhofer, Vienna (AT); Alper Ceylan, Essen (DE); Andrey Timofeev, Duisburg (DE)

(73) Assignee: Intel Deutschland GmbH, Neubiberg (DE)

(*) Notice: Subject to any disclaimer, the term of this patent is extended or adjusted under 35 U.S.C. 154(b) by 455 days.

(21) Appl. No.: 13/298,388

(22) Filed: Nov. 17, 2011

(65) Prior Publication Data
US 2013/0128929 A1 May 23, 2013

(51) Int. Cl.
H04B 1/7115 (2011.01)
H04B 1/7113 (2011.01)
H04B 1/7117 (2011.01)

(52) U.S. Cl.
CPC ............ *H04B 1/7113* (2013.01); *H04B 1/7117* (2013.01)

(58) Field of Classification Search
CPC .. H04B 1/7113; H04B 1/7115; H04B 1/7117; H04B 2201/70702; H04B 2201/709727; H04B 17/0047; H04B 17/0042; H04B 7/022
See application file for complete search history.

(56) References Cited

U.S. PATENT DOCUMENTS

| 6,188,682 | B1* | 2/2001 | Takagi et al. ................. 370/342 |
| 6,608,858 | B1 | 8/2003 | Sih et al. |
| 7,508,862 | B2 | 3/2009 | Bilgic et al. |
| 2001/0028677 | A1* | 10/2001 | Wang et al. .................. 375/148 |
| 2002/0115467 | A1* | 8/2002 | Hamabe ......................... 455/522 |
| 2003/0236074 | A1* | 12/2003 | Ishii et al. ...................... 455/69 |
| 2004/0029547 | A1* | 2/2004 | Kakehi ...................... 455/226.1 |
| 2004/0116145 | A1* | 6/2004 | Smolyar et al. .............. 455/524 |
| 2005/0008040 | A1* | 1/2005 | Becker et al. ................ 370/503 |
| 2005/0047488 | A1* | 3/2005 | Sugahara ...................... 375/148 |
| 2005/0111526 | A1* | 5/2005 | Bilgic et al. ................. 375/147 |
| 2006/0171449 | A1* | 8/2006 | Lindoff et al. ............... 375/148 |
| 2006/0251152 | A1* | 11/2006 | Li et al. ....................... 375/147 |

(Continued)

FOREIGN PATENT DOCUMENTS

| CN | 1567777 A | 1/2005 |
| CN | 1836381 A | 9/2006 |

(Continued)

OTHER PUBLICATIONS

Final Office Action Dated Sep. 26, 2014 Korean Patent Application No. 2012-0129617.

(Continued)

*Primary Examiner* — Aristocratis Fotakis
(74) *Attorney, Agent, or Firm* — Eschweiler & Associates, LLC

(57) ABSTRACT

A method of operating a Rake receiver circuit includes determining a first property of a first signal received over a dedicated channel and over a first transmission path. The method further includes determining a delay profile of a second signal and determining, on the basis of the delay profile and the first property, if the first transmission path is to be assigned to a Rake finger of the Rake receiver circuit.

18 Claims, 7 Drawing Sheets

(56) References Cited

U.S. PATENT DOCUMENTS

2008/0225993 A1* 9/2008 Malladi et al. ............... 375/340
2008/0291981 A1* 11/2008 Jonsson et al. ............... 375/148

FOREIGN PATENT DOCUMENTS

| CN | 1941647 A | 4/2007 |
| CN | 101632278 A | 1/2010 |
| CN | 102163991 A | 8/2011 |

OTHER PUBLICATIONS

Chinese Office Action dated Aug. 20, 2014 for Chinese application No. 2012104 62638.8.

* cited by examiner

RAKE RECEIVER CIRCUIT AND METHOD FOR OPERATING A RAKE RECEIVER CIRCUIT

FIELD

The invention generally relates to the field of mobile communications. In particular, the invention relates to a Rake receiver circuit and a method for operating a Rake receiver circuit.

BACKGROUND

During a communication between components of a radio communications system, signals may propagate from a transmitter to a receiver over different transmission paths. The performance of a receiver may depend on useful energy of received signals and/or noise included in these signals.

Mobile communications transceivers, circuits included therein as well as methods for operating such circuits constantly have to be improved. In particular, it is desirable to improve the reception quality and performance of mobile communications transceivers. For these and further reasons there is a need for the present invention.

BRIEF DESCRIPTION OF THE DRAWINGS

The accompanying drawings are included to provide a further understanding of embodiments and are incorporated in and constitute a part of this description. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
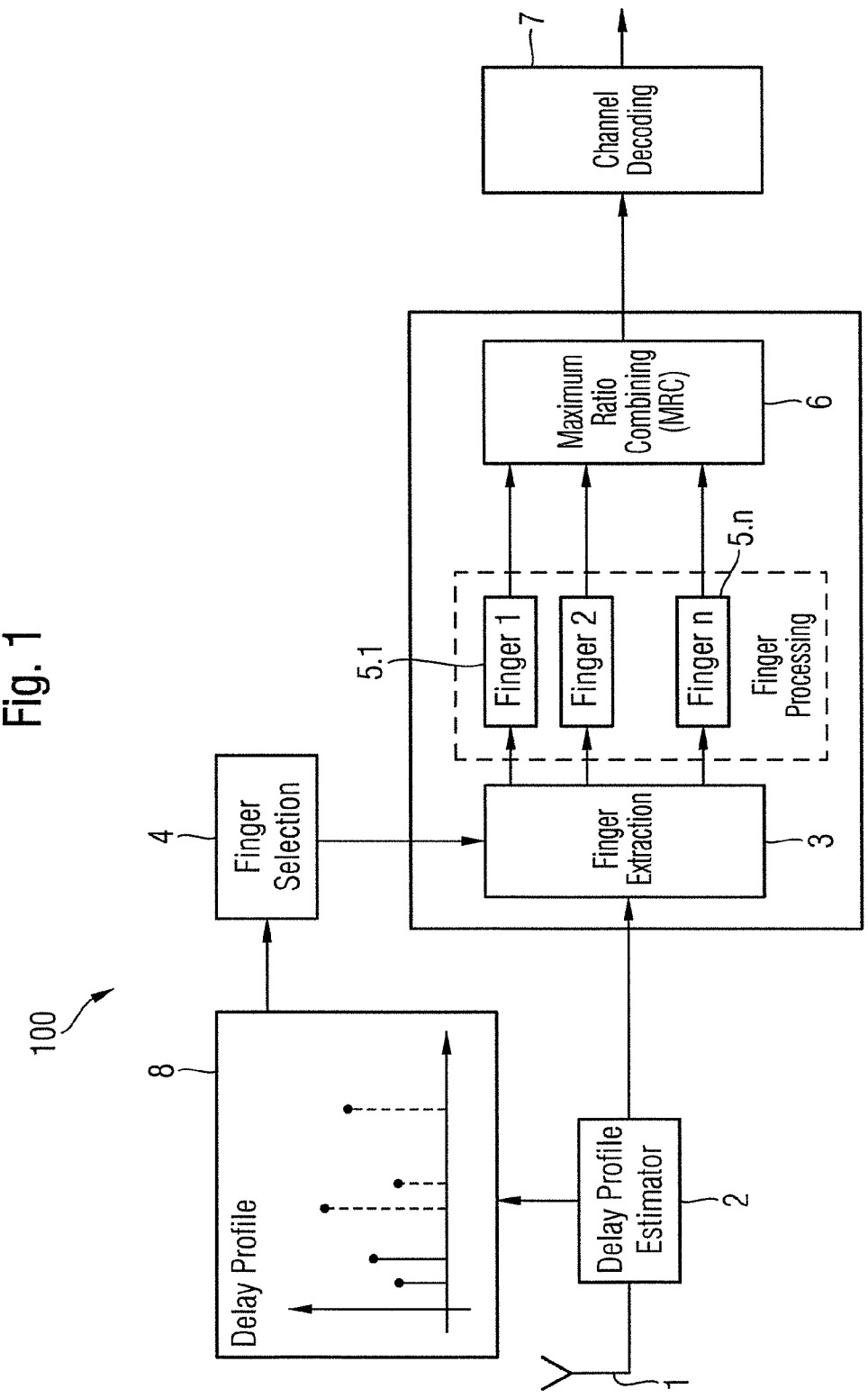
FIG. 1 schematically illustrates a Rake receiver circuit 100.

In the following, embodiments are described with reference to the drawings wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense, and the scope of protection is defined by the appended claims.

The various aspects summarized may be embodied in various forms. The following description shows by way of illustration various combinations and configurations in which the aspects may be practiced. It is understood that the described aspects and/or embodiments are merely examples and that other aspects and/or embodiments may be utilized and structural and functional modifications may be made without departing from the scope of the present disclosure. In addition, while a particular feature or aspect of an embodiment may be disclosed with respect to only one of several implementations, such feature or aspect may be combined with one or more other features or aspects of the other implementations as it may be desired and advantageous for any given or particular application. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

In the following, various methods and devices are described separately or with reference to each other. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures.

The methods and devices described herein may be used for various wireless communication networks such as Code Division Multiple Access (CDMA), Time Division Multiple Access (TDMA), Frequency Division Multiple Access (FDMA), Orthogonal FDMA (OFDMA) and Single Carrier FDMA (SC-FDMA) networks. The terms "network", "system" and "radio communications system" are often used synonymously. A CDMA network may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. A TDMA network may implement a radio technology such as Global System for Mobile Communications (GSM) and derivatives thereof such as, e.g., Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). Methods and devices described herein may particularly be part of UMTS systems which may conform to 3GPP standards for UMTS systems.

In radio communications systems, a transmitter transmitting one or more radio communications signals over one or more radio communications channels may be present. The transmitter may be a base station or a transmitting device included in a user's device, such as a mobile radio transceiver, a handheld radio device or any similar device. Note that, according to the UMTS standard, a base station may also be referred to as "Node B". Radio communications signals transmitted by transmitters may be received by receivers such as a receiving device in a mobile radio transceiver or mobile station, a handheld radio device or any similar device. Note that, according to the UMTS standard, a mobile station may also be referred to as "User Equipment" (UE). In particular, a receiver may include one of the Rake receiver circuits described herein. Radio communications signals as described herein may be provided in UMTS systems, in particular over radio communications physical channels, such as primary common pilot channels, secondary common pilot channels, dedicated physical channels, dedicated physical control channels or similar channels according to the UMTS standard.

FIG. 1 schematically illustrates a Rake receiver circuit 100 including an antenna 1, a delay profile estimator 2 that may also be referred to as path searcher, a finger extraction unit 3, a finger selection unit 4, Rake fingers 5.1 to 5.$n$, a Maximum Ratio Combining (MRC) unit 6 and a channel decoding unit 7. It is understood that the Rake receiver circuit 100 may include further components that are not illustrated for the sake of simplicity.

During an operation of the Rake receiver circuit 100 one or more radio signals may be received by the antenna 1. In particular, a received signal may be or include a multipath signal. Due to multiple transmission (or propagation) paths, the multipath signal may include multiple images (or versions) of a signal sent out by a Node B. Each of these signal images may suffer from a different path delay, phase and attenuation effects. Of course, the antenna 1 may receive multipath signals sent by Node Bs of different radio cells which may be adjacent to each other or not.

Usually the antenna 1 receives analog signals in a radio frequency range that are first down-converted into an intermediate frequency band or into a baseband by a down-conversion unit (not shown). After down-conversion, the analog signal is usually converted to a digital signal by means of an Analog-to-Digital Converter (ADC) (not shown) to provide digital samples. The digital samples may include In-phase (I) and Quadrature (Q) components that are divided into digital streams of I and Q samples. It is understood that the Rake receiver circuit 100 may further include amplifiers, analog filters, digital filters, etc., that are not shown for the sake of simplicity.

Signals received by the antenna 1 may be forwarded to the delay profile estimator 2 that is configured to determine a delay profile of a multipath signal, for example using pilot symbols received over a common pilot channel and/or a dedicated pilot channel. FIG. 1 includes a qualitative and exemplary delay profile 8 in which energies of signals received over various transmission paths are plotted against the delay times of the transmission paths. Note that the transmission paths may belong to different radio cells. In the delay profile 8 of FIG. 1, the two signal energies illustrated by continuous lines are associated with signals received from a first radio cell while the remaining three signal energies illustrated by dashed lines belong to signals received from a second radio cell. Note that the delay profile estimator 2 may determine various delay profiles, each of which may take into account signals received from only one radio cell. The individual delay profiles may then be combined to an overall delay profile.

Information of the delay profile 8 may be forwarded to the finger selection unit 4 that is configured to determine if one or more multipath transmission paths identified by the delay profile estimator 2 is to be assigned to a corresponding number of the Rake fingers 5.1 to 5.$n$. That is, each of the Rake fingers 5.1 to 5.$n$ may receive its own image (or version) of the signal originally transmitted by a Node B. For example, the finger selection unit 4 may determine transmission paths having signal energies exceeding a predetermined (and particularly non-zero) energy threshold value. Note that each of the Rake fingers 5.1 to 5.$n$ may be time-aligned to process its input signal at an assigned path delay. For this purpose, each of the Rake fingers 5.1 to 5.$n$ may include delay elements (not shown) to delay the digital signals corresponding to the respective delays between the multiple transmission paths.

The delay profile estimator 2 may forward the received signal and/or information of the delay profile 8 to the finger extraction unit 3 that is configured to allocate one or more of the Rake fingers 5.1 to 5.$n$ to one or more transmission paths determined by the finger selection unit 4. In addition, the finger extraction unit 4 is further configured to extract data associated with a specific transmission path from the received signal including data of various transmission paths.

The data of the transmission paths assigned to the Rake fingers 5.1 to 5.$n$ is processed by components included in the Rake fingers 5.1 to 5.$n$. For example, the signals received at the antenna 1 may be spread by means of a spreading code used in conventional CDMA communications systems. Each of the spread multipath signals may be despread in the Rake fingers 5.1 to 5.$n$ using despreaders (or correlators). The despreaders correlate the spread signals with a chip sequence to obtain corresponding despread signals. The chip sequence may be generated by a chip sequence generator (not shown). Each of the Rake fingers 5.1 to 5.$n$ may further include descrambling units or demodulation units (not shown).

The signals processed by the Rake fingers 5.1 to 5.$n$ are output to the maximum ratio combining (MRC) unit 6 in which the signals may be weighted according to an MRC scheme and may be combined to a single signal. The combined signal may be decoded by the channel decoding unit 7 according to an arbitrary decoding scheme and may then be forwarded and processed by further components of the Rake receiver circuit 100 that are not illustrated for the sake of simplicity.

It is understood that the described assignment of transmission paths to the usually limited number of Rake fingers 5.1 to 5.N may have an impact on the performance of the Rake receiver circuit 100. For example, if transmission paths with a signal energy higher than the signal energies of other transmission paths are discarded, useful signal energy may not be used. In addition, if transmission paths having a signal energy lower than the signal energies of other transmission paths are assigned to Rake fingers, undesirable noise may be created. Unused signal energy and undesirable noise may both result in a performance degradation of the Rake receiver circuit 100. Note that the delay profile 8 is constantly changing. Hence, the assignment of transmission paths to the Rake fingers 5.1 to 5.$n$, which may also be referred to as Rake finger placement, has to be frequently adapted.

Figure 2:
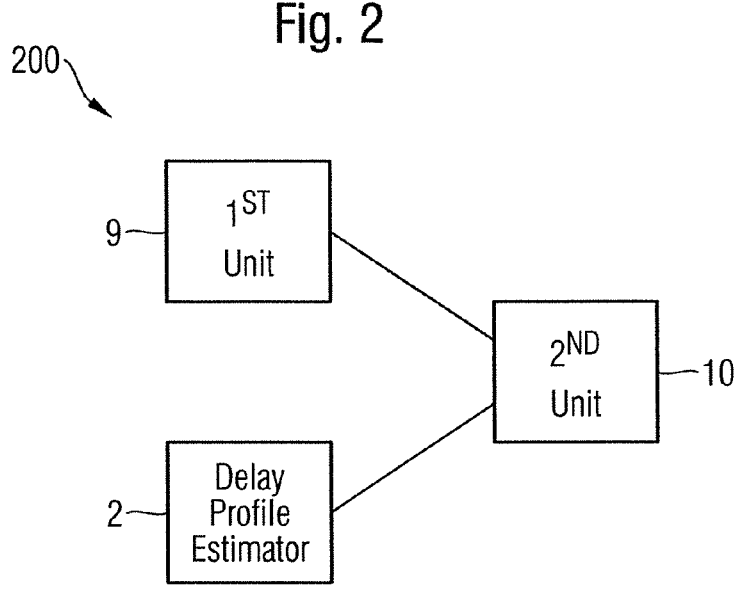
FIG. 2 schematically illustrates a Rake receiver circuit 200 as an exemplary embodiment.

FIG. 2 schematically illustrates a Rake receiver circuit 200 including a delay profile estimator 2, a first unit 9 and a second unit 10. It is understood that the Rake receiver circuit 200 may include further components that are not illustrated for the sake of simplicity. For example, the Rake receiver circuit 200 may include one or more components described in connection with FIGS. 1 and 4. The first unit 9 is configured to determine a first property (or first characteristic) of a first signal received over a dedicated channel and over a first transmission path. For example, the first signal may be a part of a multipath signal, i.e. an image (or a version) of a signal sent by a Node B and received over the first transmission path. In addition, the dedicated channel may be or may include a Dedicated Physical Channel (DPCH) and/or a dedicated pilot channel and the first property may be or may include a Signal-to-Noise Ratio (SNR) of the first signal. In this connection, it is noted that all comments made herein in connection with an SNR may also hold true for a corresponding Signal-to-Interference-plus-Noise Ratio (SINR). The delay profile estimator 2 is configured to determine a delay profile of a second signal and may be similar to the delay profile estimator of FIG. 1. The second unit 10 is configured to determine, on the basis of the delay profile and the first property, if the first transmission path is to be assigned to a Rake finger (not shown) of the Rake receiver circuit 200. For example, the second unit 10 may assign the first transmission path to a Rake finger if the SNR of the first signal exceeds an arbitrary predetermined (and particularly non-zero) threshold value.

There may occur scenarios in which the performances of the Rake receiver circuits 100 and 200 may differ from each other. An exemplary scenario is described in connection with FIG. 3 that schematically illustrates two bars indicating power allocations of two radio cells A and B. The left bar shows powers provided by radio cell B while the right bar shows powers provided by radio cell A. Considering a soft handover scenario, i.e. a UE connected to both cells A and B, each one of the illustrated bars indicates a power provided to a Common Pilot Channel (see "CPICH"), a power provided to further common channels (e.g. a Common Control Physical Channel (CCPCH), an Acquisition Indication Channel (AICH), etc., see "Other common channels"), a power provided to a DPCH dedicated to the considered UE (see "Own DPCH") and a power provided to all further UEs located in the respective radio cell (see "Other users").

Note that the CPICH is usually transmitted with a constant signal power while the DPCH may be power controlled. That is, the energy a Node B or radio cell allocates to a UE for the DPCH may vary according to requests of the UE and/or the power available in the power budget of the Node B. Note further that the DPCH is the channel where the user's data may be mapped to. Hence, the DPCH may be regarded as the relevant channel when evaluating the reception quality of a receiver receiving data over the DPCH.

Figure 3:
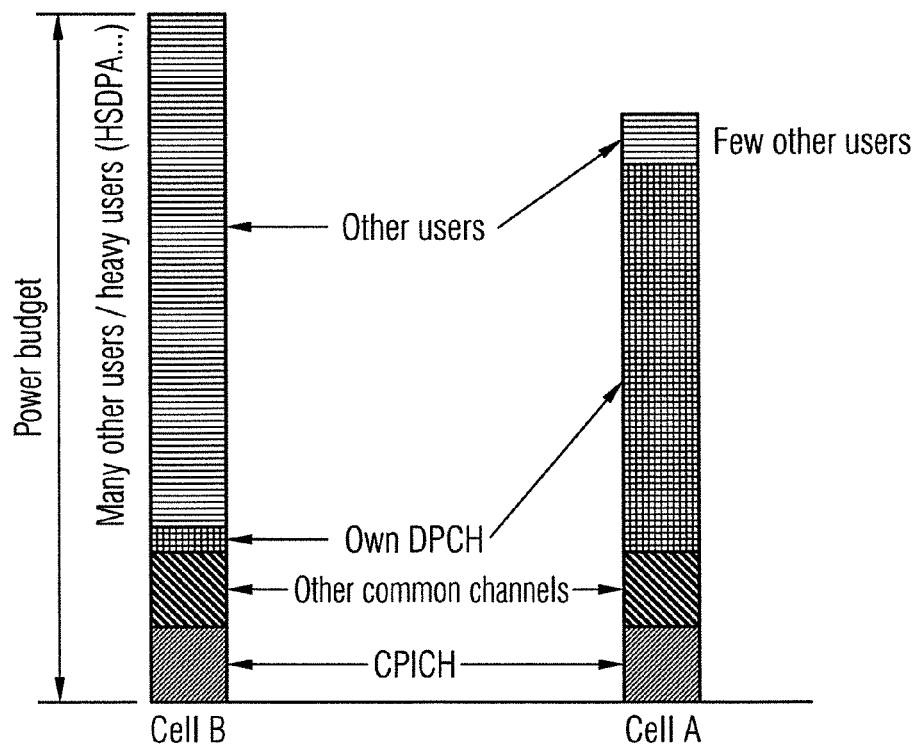
FIG. 3 schematically illustrates power allocations of two radio cells.

In the exemplary scenario of FIG. 3, cell B may be located in an area including a lot of users or UEs (e.g. an airport) which may generate a lot of heavy data traffic, for example High Speed Downlink Packet Access (HSDPA) data traffic. As can be seen from the left bar in FIG. 3, the power budget of cell B is at its maximum limit. Due to the heavy data traffic only a small amount of power is allocated to the DPCH of the considered UE. Cell A (see right bar) may be located in an area including less UEs (e.g. a rural area next to the airport). Since cell A has a smaller number of users, a larger part of its transmit power budget may be allocated and provided to the DPCH of the UE under consideration.

Consider now for this scenario the considered UE to include the Rake receiver circuit 100. During an operation of the UE, the delay profile estimator 2 may determine a delay profile based on the CPICH and transmission paths of signals received from both cells A and B. The Rake receiver circuit 100 may then assign transmission paths having the highest signal energies to the Rake fingers 5.1 to 5.n. As already mentioned, the CPICH is transmitted with the same (constant) signal power in both cells A and B. However, due to different attenuation effects, there may occur a first transmission path of a signal sent from cell B having a higher signal energy compared to a second transmission path of a signal sent from cell A. The finger selection unit 4 may then give a higher priority to the first transmission path of cell B and assign this path to a Rake finger while the second transmission path of cell A may be discarded. That is, even though cell B provides less power to the DPCH of the considered UE than cell A does, the finger selection unit 4 selects the first transmission path of cell B instead of the second transmission path of cell A. Since the DPCH may be considered as relevant channel when evaluating the reception quality, the finger selection of the Rake receiver circuit 100 may thus be regarded as suboptimal.

Consider now the same scenario, but for the case of the considered UE including the Rake receiver circuit 200. During an operation of the UE, the first unit 9 may, for example, determine an SNR of a signal received over the DPCH and over the first transmission path of cell B as well as an SNR of a signal received over the DPCH and over the second transmission path of cell A. From FIG. 3 it can be seen that, due to the values of the DPCH transmit power in cells A and B, the SNR value for the first transmission path of cell B may have a lower value than the SNR value for the second transmission path of cell A. Although a signal received over the CPICH and over the first transmission path of cell B may have a higher signal energy compared to a signal received over the CPICH and over the second transmission path of cell A, the second unit 10 may give a higher priority to the second transmission path of cell A and assign this path to a Rake finger instead of the first transmission path of cell B. For the considered scenario and compared to the receiver circuit 100, the finger selection of the receiver circuit 200 may thus be regarded as optimal with regard to the reception quality. In other words, the finger selection of the Rake receiver circuit 200 may take into account information of the DPCH and thus may outperform the finger selection of the Rake receiver circuit 100 which depends on the CPICH and ignores information of the DPCH. Note further that the finger selection of the Rake receiver circuit 100 merely depends on the delay profile while the finger selection of the Rake receiver circuit 200 additionally takes into account information included in the first property.

Note that the described finger selection based on the first property may be switched off if desired. For example, a first signal power of the dedicated channel associated with the considered UE and cell A as well as a second signal power of the dedicated channel associated with the considered UE and cell B may be determined. If a difference between the first signal power and the second signal power is smaller than a predetermined (particularly non-zero) threshold value, the described finger selection based on the first property may be switched off and a finger selection e.g. solely based on information of a delay profile estimator may be chosen. In another embodiment, the finger selection based on the first property may be switched off if the considered UE merely receives signals from only one radio cell.

Figure 4:
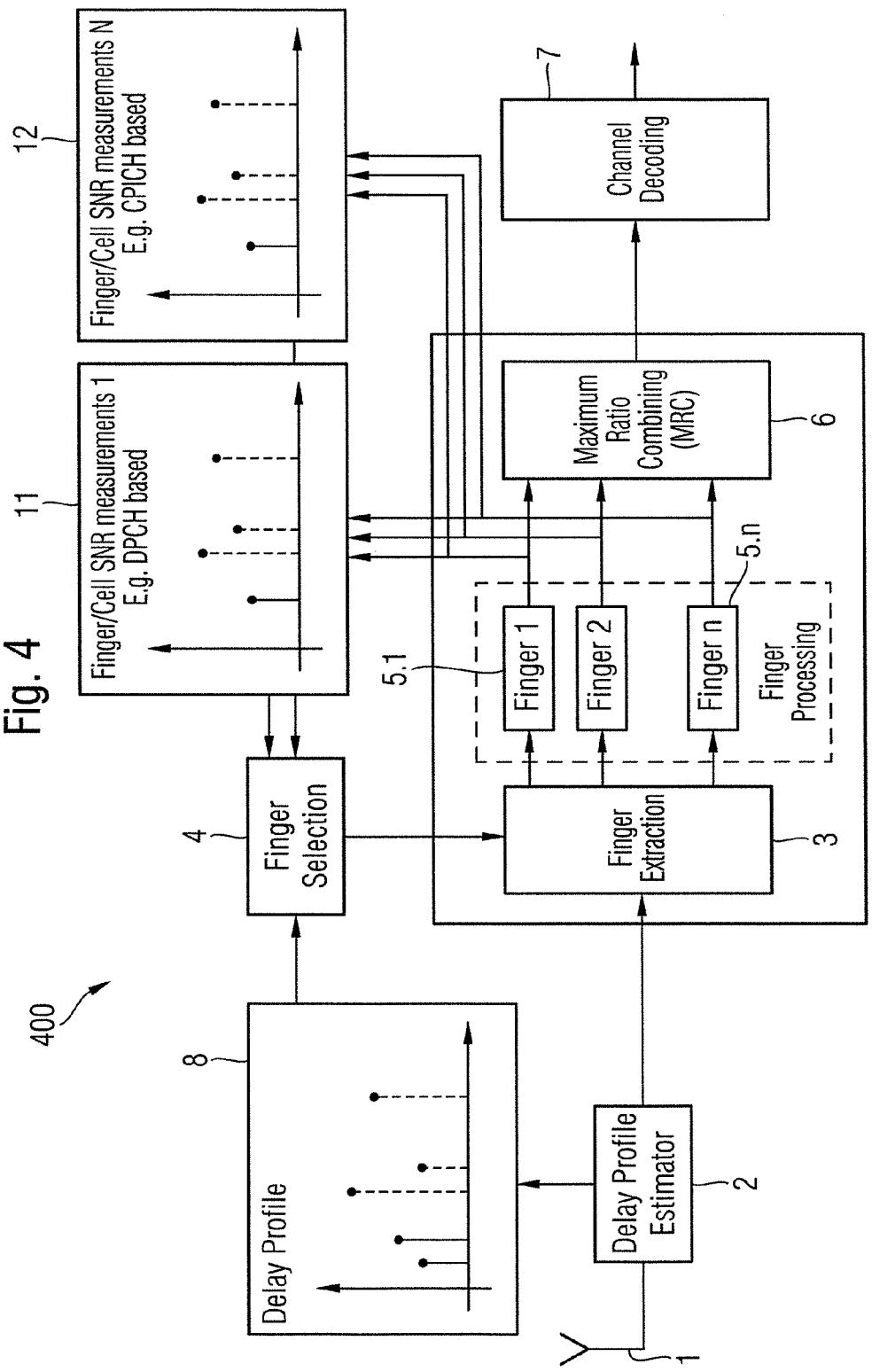
FIG. 4 schematically illustrates a Rake receiver circuit 400 as an exemplary embodiment.

FIG. 4 schematically illustrates a Rake receiver circuit 400 including an antenna 1, a delay profile estimator 2 configured to determine a delay profile 8, a finger extraction unit 3, a finger selection unit 4, Rake fingers 5.1 to 5.n, an MRC unit 6 and a channel decoding unit 7. The components of FIG. 4 may correspond to similar components already described in connection with the receiver circuit 100 of FIG. 1.

The Rake receiver circuit 400 may further include one or more units (not shown) configured to determine an SNR of one or more signals received over a dedicated channel and over one or more transmission paths. For example, each of the Rake fingers 5.1 to 5.n may include a unit configured to determine an SNR of a signal received over the DPCH and processed in the respective Rake finger. In FIG. 4, a profile 11 illustrates determined SNR values based on the DPCH and received over various transmission paths plotted against the delay times of the respective transmission paths. Similar to the delay profile 8, the considered transmission paths may belong to different radio cells. Information of the diagram 11 may be forwarded to the finger selection unit 4 to be used for a finger selection. In the profile 11, the SNR value illustrated by a continuous line is associated with a signal received from a first radio cell while the SNR values illustrated by dashed lines belong to a second radio cell. Of course, various profiles with each of them taking into account signals received from only one radio cell may be determined and may then be combined to an overall profile.

The Rake receiver circuit 400 may further include one or more units (not shown) configured to determine an SNR of one or more signals received over a pilot channel and over one or more transmission paths. For example, each of the Rake fingers 5.1 to 5.n may include a unit configured to determine an SNR of a signal received over the CPICH and processed in the respective Rake finger. In FIG. 4, a profile 12 illustrates the determined SNR values based on the CPICH and received over various transmission paths plotted against the delay times of the respective transmission paths. Similar to the profiles 8 and 11, the considered transmission paths may belong to different radio cells. Information included in the profile 12 may be forwarded to the finger selection unit 4 to be used for a finger selection.

It is understood that the finger selection unit 4 may receive further data that may be used for assigning transmission paths to the Rake fingers 5.1 to 5.n. For example, the Rake receiver circuit 400 may include a unit (not shown) configured to determine frequency offsets of one or more signals received over different transmission paths over a dedicated channel and/or over a pilot channel. Such frequency offsets may e.g. be caused by a Doppler effect. If a frequency offset associated with a specific transmission path differs from a mean value of frequency offsets of one or more of the other transmission paths by a predetermined (and particularly non-zero) threshold value, the transmission path may be discarded, i.e. not assigned to one of the Rake fingers 5.1 to 5.n.

Comparing the Rake receiver circuits 100 and 400, the finger selection of the Rake receiver circuit 400 does not merely depend on signal energies determined by the delay profile estimator 2. Rather, the finger selection unit 4 of the Rake receiver circuit 400 may use further information on one or more SNR values based on the DPCH and/or one or more SNR values based on the CPICH. Referring to the scenario of FIG. 3, the finger selection of the Rake receiver circuit 400 may be regarded as optimal with regard to the reception quality. Note that comments made in connection with the Rake receiver circuit 200 having a similar finger selection may also hold true for the Rake receiver circuit 400.

In the following, an exemplary method for operating the receiver circuit 400 is described. Here, the delay profile estimator 2 may determine a delay profile including signal energies associated with transmission paths from e.g. two cells. If a "good" transmission path (e.g. a transmission path having a signal energy exceeding a predetermined (and particularly non-zero) threshold value) is determined, DPCH and/or CPICH data received over the determined transmission path may be (test-wise) processed in one of the Rake fingers 5.1 to 5.n. In particular, the data may be processed in a Rake finger that is currently not contributing to the MRC performed by unit 6. If all Rake fingers 5.1 to 5.n contribute to the MRC process, a Rake finger currently processing signals having low SNR values for the DPCH and/or the CPICH or low signal energies for the CPICH may be excluded from the MRC process and allocated for the test-wise processing of data. For the test-wise data processing, an arbitrary number of data frames, in particular one data frame or two data frames or three data frames, may be used in order to determine the SNR values of the DPCH and/or the CPICH. In particular, determining the SNR values may be based on a part of a received signal having a maximum length of 30 milliseconds.

If the transmission path for which a test-wise processing of data has been performed is identified as "good" (for example since one or more of the SNR values for the DPCH and/or the CPICH exceeds a predetermined (and particularly non-zero) threshold value), the transmission path may be assigned to the Rake finger in which the test-wise data processing has been performed or any other of the Rake fingers 5.1 to 5.n. In the selected Rake finger later data associated with the determined transmission path may then contribute to a later MRC process. In particular, further data received from the determined transmission path may be processed in the assigned Rake finger for at least a duration of 30 milliseconds after the finger selection.

Figure 5:
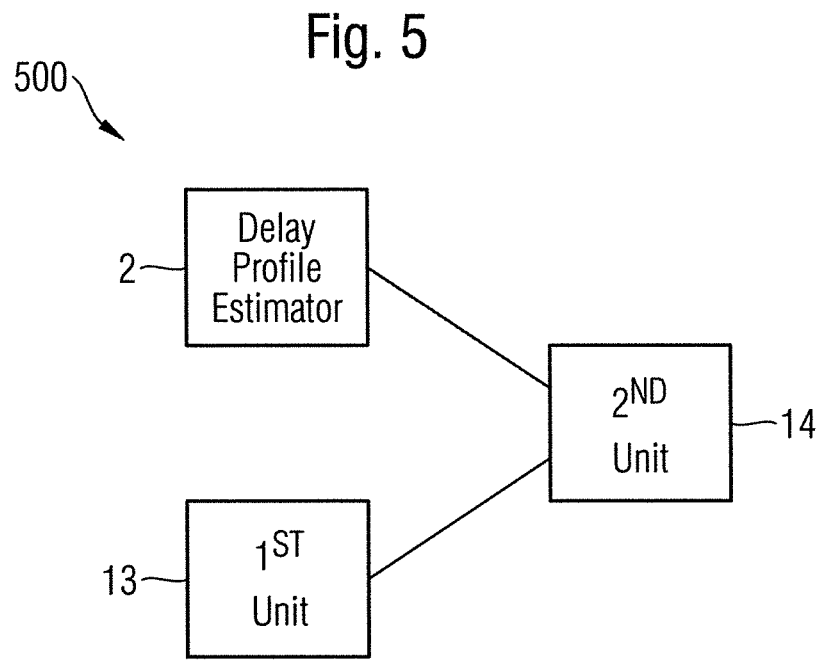
FIG. 5 schematically illustrates a Rake receiver circuit 500 as an exemplary embodiment.

FIG. 5 schematically illustrates a Rake receiver circuit 500 including a delay profile estimator 2, a first unit 13 and a second unit 14. It is understood that the Rake receiver circuit 500 may include further components that are not illustrated for the sake of simplicity. For example, the Rake receiver circuit 500 may include one or more of the components described in connection with FIGS. 1 and 4. The first unit 13 is configured to determine a property of a first signal received over a pilot channel, e.g. a common pilot channel or a dedicated pilot channel. For example, the property of the first signal may correspond to or may include an SNR of the first signal received over the pilot channel. The delay profile estimator 2 is configured to determine a delay profile of a second signal and may be similar to one of the delay profile estimators of FIGS. 1 and 4. The second unit 14 is configured to determine on the basis of the delay profile and of the property if a transmission path of the first signal is to be assigned to a Rake finger (not shown) of the Rake receiver circuit 500.

Note that, compared to the Rake receiver circuit 100 of FIG. 1, the finger selection of the Rake receiver circuit 500 does not merely depend on the delay profile, but also on the property which may, for example, be based on the DPCH. Hence, for the scenario of FIG. 3, the finger selection of the receiver circuit 500 may be regarded as optimal with regard to the reception quality. Comments made in connection with the Rake receiver circuit 200 of FIG. 2 may also hold true for the Rake receiver circuit 500.

Figure 6:
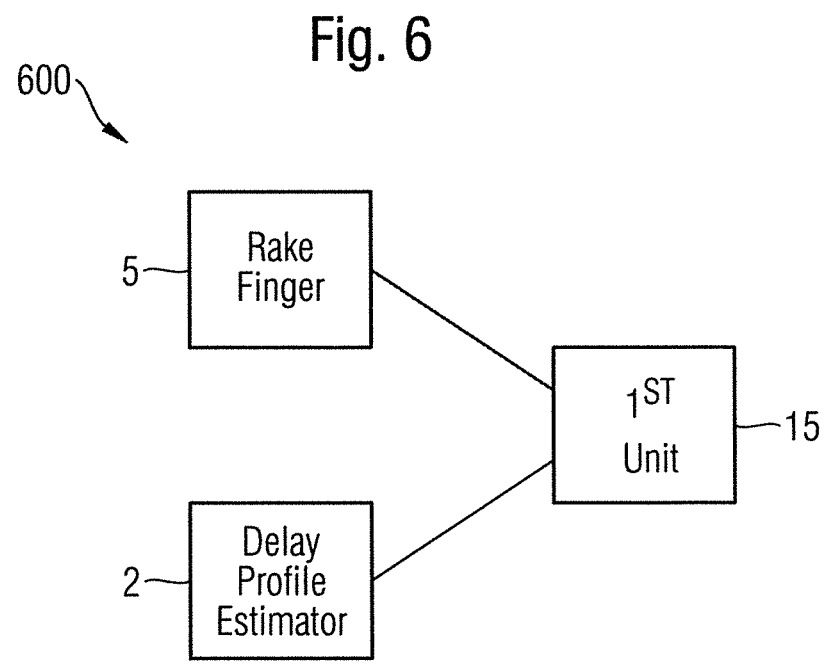
FIG. 6 schematically illustrates a Rake receiver circuit 600 as an exemplary embodiment.

FIG. 6 schematically illustrates a Rake receiver circuit 600 including a delay profile estimator 2, a Rake finger 5 and a first unit 15. It is understood that the circuit 600 may include further components that are not illustrated for the sake of simplicity. For example, the circuit 600 may include one or more of the components described in connection with FIGS. 1 and 4. Comments made in connection with FIGS. 1 and 4 may thus also hold true for the Rake receiver circuit 600. The delay profile estimator 2 may be similar to one of the delay profile estimators also described herein. The Rake finger 5 is configured to process data, for example received over a dedicated channel. The first unit 15 is configured to determine if a transmission path of a received signal is to be assigned to the Rake finger 5 on the basis of the delay profile and the data processed in the Rake finger 5.

Note that the finger selection of the first unit 15 may depend on data processed in the Rake finger 5. Assigning a transmission path to the Rake finger 5 may thus not merely depend on a delay profile that is usually determined before data is processed in a Rake finger. A finger selection may thus also take into account properties of a dedicated channel determined during or after a processing of dedicated data in a Rake finger. Hence, for the scenario of FIG. 3 and similar to the Rake receiver circuit 200, the finger selection of the receiver circuit 600 may be regarded as optimal with regard to the reception quality.

Figure 7:
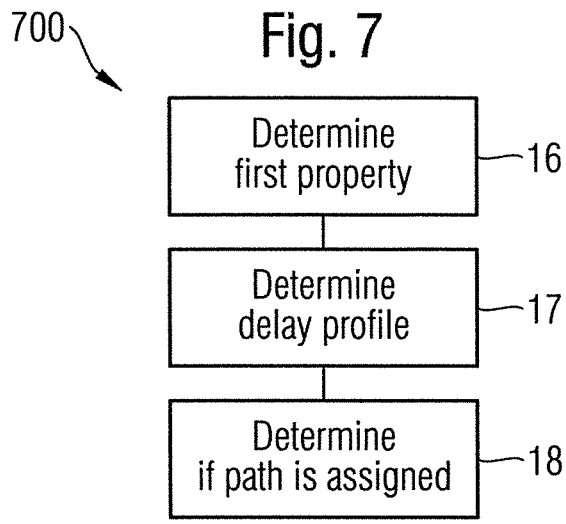
FIG. 7 schematically illustrates a method 700 for operating a Rake receiver circuit as an exemplary embodiment.

FIG. 7 schematically illustrates a method 700 for operating a Rake receiver circuit. The flow chart of FIG. 7 may be read in connection with the Rake receiver circuit 200 of FIG. 2 in one embodiment, but is not so limited. In a first method step 16, a first property of a first signal received over a dedicated channel and over a first transmission path is determined (see first unit 9 of FIG. 2). In a second method step 17, a delay profile of a second signal is determined (see delay profile estimator 2 of FIG. 2). Note that FIG. 7 does not necessarily imply that method step 17 is performed after method step 16. Rather, it is also possible that method step 16 is performed after method step 17 or at least parts of both method steps 16 and 17 are performed at the same time. In a third method step 18, it is determined on the basis of the delay profile and the first property if the first transmission path is to be assigned to a Rake finger of the Rake receiver circuit (see second unit 10 of FIG. 2). Of course, the method 700 may also be read in connection with FIG. 4 wherein the first method step 16 may correspond to or may include determining the profile 11, the second method step 17 may correspond to or may include determining the profile 8 and the third method step 18 may correspond to or may include assigning a transmission path to one of the Rake fingers 5.1 to 5.n by means of the finger selection unit 4.

Figure 8:
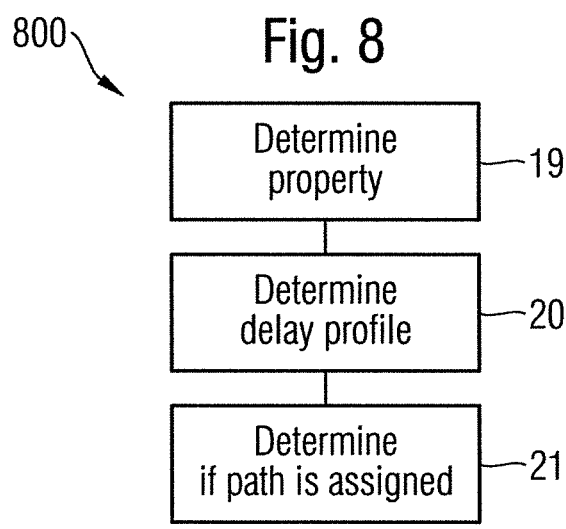
FIG. 8 schematically illustrates a method 800 for operating a Rake receiver circuit as an exemplary embodiment.

FIG. 8 schematically illustrates a method 800 for operating a Rake receiver circuit. The flow chart of FIG. 8 may be read in connection with the Rake receiver circuit 500 of FIG. 5 in one embodiment, but is not so limited. In a first method step 19, a property of a first signal received over a pilot channel is determined (see first unit 13 of FIG. 5). In a second method step 20, a delay profile of a second signal is determined (see delay profile estimator 2 of FIG. 5). Note that FIG. 8 does not necessarily imply that method step 20 is performed after method step 19. Rather, it is also possible that method step 19 is performed after method step 20 or at least parts of both method steps 19 and 20 are performed at the same time. In a third method step 21, it is determined on the basis of the delay profile and of the property if a transmission path of the first signal is to be assigned to a Rake finger of the Rake receiver circuit (see second unit 14 of FIG. 5). Of course, the method 800 may also be read in connection with FIG. 4 wherein the first method step 19 may correspond to or may include determining the profile 11 and/or the profile 12, the second method step 20 may correspond to or may include determining the delay profile 8 and the third method step 21 may correspond to or may include allocating a transmission path to one of the Rake fingers 5.1 to 5.n by means of the finger selection unit 4.

Figure 9:
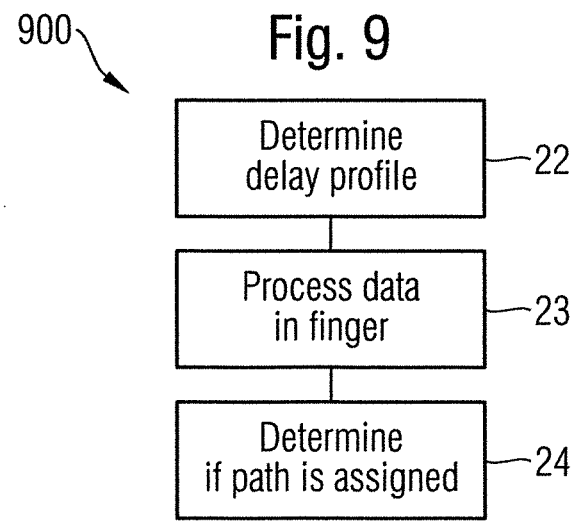
FIG. 9 schematically illustrates a method 900 for operating a Rake receiver circuit as an exemplary embodiment.

FIG. 9 schematically illustrates a method 900 for operating a Rake receiver circuit. The flow chart of FIG. 9 may be read in connection with the Rake receiver circuit 600 of FIG. 6 in one embodiment, but is not so limited. In a first method step 22, a delay profile is determined (see delay profile estimator 2 of FIG. 6). In a second method step 23, data is processed in a Rake finger of the Rake receiver circuit (see Rake finger 5 of FIG. 6). In a third method step 24, it is determined if a transmission path of a received signal is to be assigned to the Rake finger on the basis of the delay profile and the processed data (see first unit 15 of FIG. 6). Of course, the method 900 may also be read in connection with FIG. 4 wherein the first method step 22 may correspond to or may include determining the delay profile 8, the second method step 23 may correspond to or may include processing data in one of the Rake fingers 5.1 to 5.n and the third method step 24 may correspond to or may include allocating a transmission path to one of the Rake fingers 5.1 to 5.n by means of the finger selection unit 4.

Figure 10A:
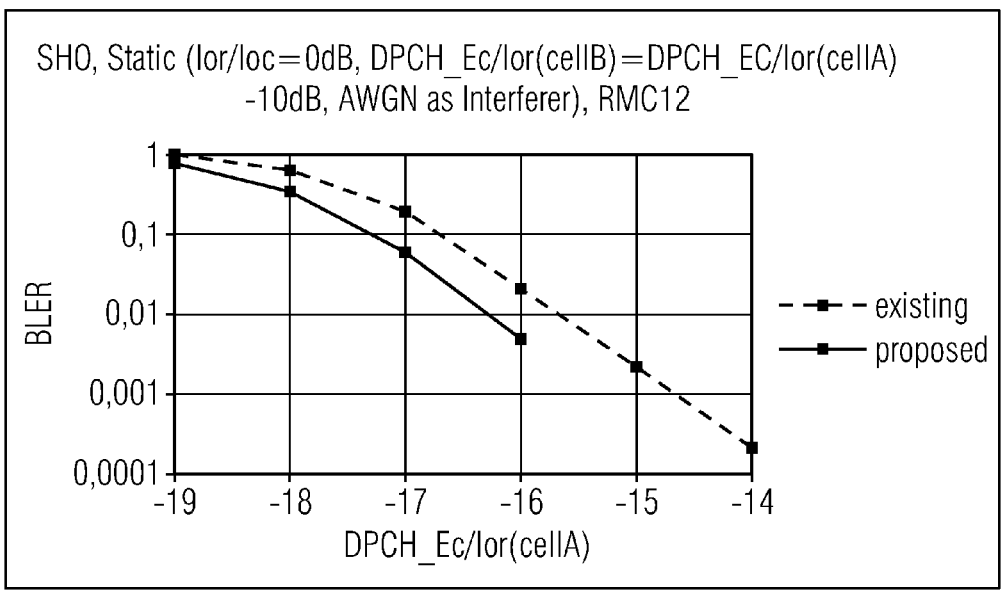
FIGS. 10A to 10C schematically illustrate performances of Rake receiver circuits.
Figure 10B:
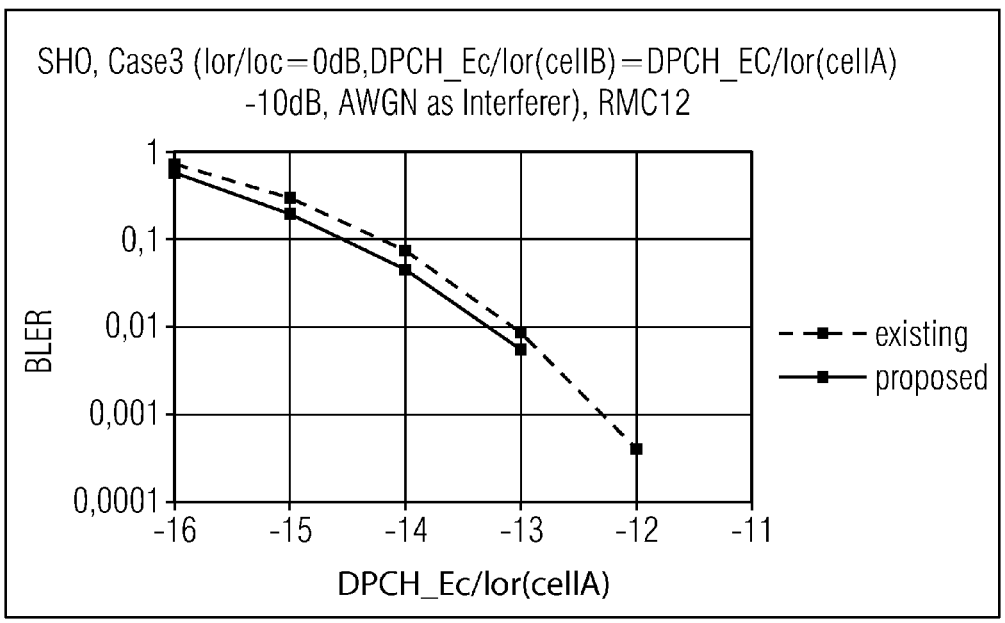
Figure 10C:
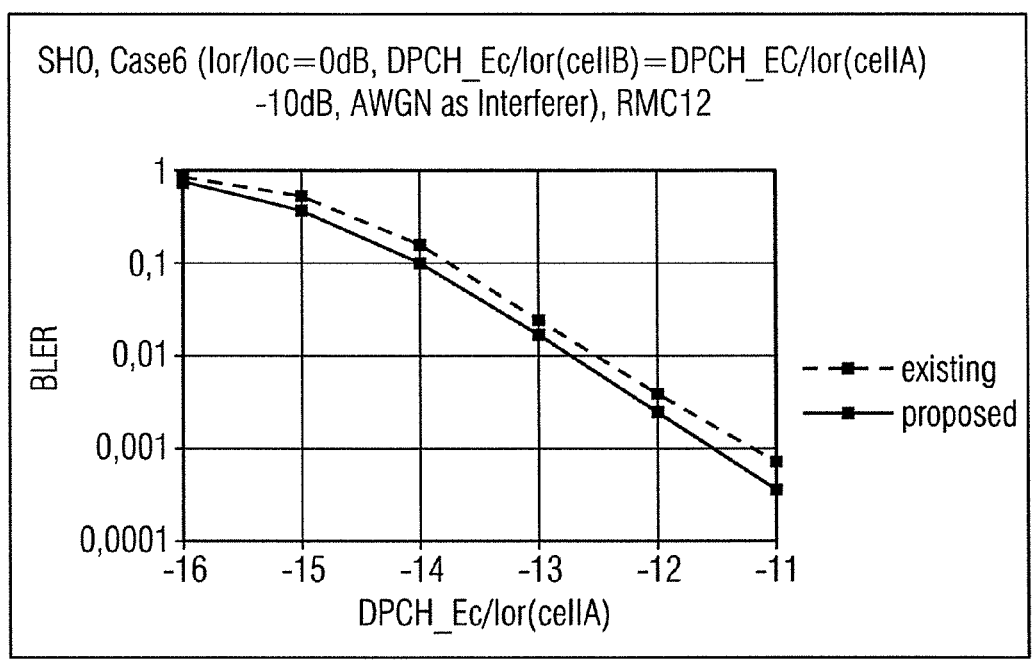

FIGS. 10A to 10C schematically illustrate performances of Rake receiver circuits wherein a Block Error Rate (BLER) is plotted against a quantity DPCH_Ec/Ior that refers to a ratio of chip energy of the DPCH (DPCH_Ec) to a total power of a considered cell (Ior). Each of FIGS. 10A to 10C refers to a soft handover scenario in which a UE may receive multipath signals from two radio cells A and B. The scenario of each figure is further specified by variables that are e.g. known from various 3GPP specifications, for example the specification TS 25.101. The meanings of the variables are as follows: SHO (=Soft Hand Handover), AWGN (=Additive White Gaussian Noise), RMC12 (=Reference Measurement Channel having e.g. 12.2 kbps (see e.g. Annex A.3.1 of TS 25.101), Case3 and Case6 refer to multipath propagation conditions defined by the 3GPP standard (see e.g. Annex B.2.2 of TS 25.101)).

For the considered cases, the radio cells A and B provide the same power for the CPICH, but different powers for the respective DPCH allocated for the UE. As can be seen from each of FIGS. 10A to 10C, cell B provides 10 dB less power to the DPCH than cell A does. Each of FIGS. 10A of 10C illustrates the performance of a Rake receiver circuit that assigns transmission paths to Rake fingers on the basis of a delay profile using CPICH properties (see label "existing"). The graph labeled "existing" thus may be associated with the Rake receiver of FIG. 1. In addition, each of FIGS. 10A of 10C illustrates the performance of a Rake receiver circuit that assigns transmission paths to Rake fingers on the basis of additional DPCH properties (see label "proposed"). The graph labeled "proposed" thus may be associated to one of the Rake receiver circuits of FIGS. 2, 4, 5 and 6.

From each of FIGS. 10A to 10C it can be seen that for each value of DPCH_Ec/Ior the BLER values for the "proposed" solution are smaller than the BLER values for the "existing" solution. Hence, for each of the shown cases, the performance of the "proposed" Rake receiver circuit is improved compared to the performance of the "existing" Rake receiver circuit.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A method of operating a Rake receiver circuit, comprising:
   receiving a plurality of signals, wherein each signal is received over one of a plurality of channels comprising at least a first channel and a second channel, and is received via one of a plurality of transmission paths comprising at least a first transmission path and a second transmission path;
   determining a first property associated with a first signal of the plurality of signals, wherein the first signal is received over the first channel and via the first transmission path, wherein the first property is one of a signal-to-noise-ratio or a signal-to-interference-plus-noise ratio of the first signal, wherein the first channel is a dedicated physical data channel;

determining a delay profile of a second signal of the plurality of signals, wherein the second signal is different from the first signal and is received over the second channel and via the first transmission path, wherein the second channel is at least one of a pilot channel or a control channel;

determining, on the basis of the delay profile, whether to assign the first transmission path to a Rake finger of the Rake receiver circuit; and determining a first signal power of the first signal and a second signal power of a third signal of the plurality of signals, wherein the third signal is associated with the second transmission path, wherein the determining whether to assign is independent of the first property when at least one of a first condition or a second condition is true, wherein the first condition is whether a difference between the first signal power and the second signal power is smaller than a predetermined threshold value, wherein the second condition is whether each of the plurality of transmission paths is received from a common radio cell, and wherein the determining whether to assign is based on the first property when neither the first condition nor the second condition is true.

2. The method of claim 1, further comprising:
determining a frequency offset of the first transmission path relative to at least one other transmission path, wherein determining if the first transmission path is to be assigned to the Rake finger is further based on the frequency offset.

3. The method of claim 1, wherein determining the first property of the first signal comprises processing the first signal in the Rake finger.

4. The method of claim 1, wherein the second signal is received over a common pilot channel.

5. The method of claim 1, wherein the second signal is received over a dedicated pilot channel.

6. The method of claim 1, wherein the second signal comprises a multipath signal, propagating along the plurality of transmission paths, and wherein the delay profile of the second signal is determined before determining the first property.

7. The method of claim 6, further comprising:
determining the first transmission path from the plurality of transmission paths before determining the first property.

8. The method of claim 6, wherein the plurality of transmission paths comprises transmission paths of signals received from a first radio cell and transmission paths of signals received from a second radio cell.

9. The method of claim 1, wherein the method is performed in a mobile telecommunications system that comprises soft handovers.

10. The method of claim 1, wherein determining the first property is based on a part of the first signal having a maximum length of 30 milliseconds.

11. The method of claim 1, further comprising after determining whether to assign the first transmission path to the Rake finger of the Rake receiver circuit:
processing data of the first signal in the assigned Rake finger for at least a duration of 30 milliseconds.

12. A method for operating a Rake receiver circuit, comprising:
determining a delay profile of a first received signal received over at least one of a pilot channel or a control channel;

processing data associated with a second physical channel in a Rake finger of the Rake receiver circuit, the data being derived from a second received signal via a first transmission path, the second received signal being received over the second physical channel, wherein the second physical channel is control channel a dedicated physical data channel;

determining whether the first transmission path is to be assigned to the Rake finger on the basis of the delay; and determining a signal power of the second received signal and an additional signal power of a third received signal, wherein the third received signal is received over the second channel and via a second transmission path distinct from the first transmission path, wherein the determining whether the first transmission path is to be assigned is independent of the processed data when at least one of a first condition or a second condition is true, wherein the first condition is whether a difference between the signal power and the additional signal power is smaller than a predetermined threshold value, wherein the second condition is whether the first transmission path and the second transmission path are received from a common radio cell, and wherein the determining whether the first transmission path is to be assigned is based on the processed data when neither the first condition nor the second condition is true.

13. A Rake receiver circuit, comprising:
a first unit configured to determine a first property associated with a first signal, wherein the first signal is received over a first channel and via a first transmission path, wherein the first property is determined from the first signal, wherein the first channel is a dedicated physical data channel;

a delay profile estimator configured to determine a delay profile of a second signal different from the first signal and received at least one of a pilot channel or a control channel; and a second unit configured to determine, on the basis of the delay profile, whether to assign the first transmission path to a Rake finger of the Rake receiver circuit, wherein the first unit is further configured to determine a first signal power of the first signal and a second signal power of a third signal, wherein the third signal is received over the second channel and via a second transmission path distinct from the first transmission path, wherein the second unit is configured to determine whether to assign independently of the first property when at least one of a first condition or a second condition is true, wherein the first condition is whether a difference between the first signal power and the second signal power is smaller than a predetermined threshold value, wherein the second condition is whether the first transmission path and the second transmission path are received from a common radio cell, and wherein the second unit is configured to determine whether to assign based on the first property when neither the first condition nor the second condition is true.

14. The Rake receiver circuit of claim 13, wherein the first property comprises at least one of a first Signal-to-Interference-plus-Noise Ratio of the first signal or a first Signal-to-Noise Ratio of the first signal.

15. The Rake receiver circuit of claim 13, further comprising:
a unit configured to determine, for the first transmission path, at least one of a Signal-to-Interference-plus-Noise Ratio of the first transmission path or a Signal-to-Noise Ratio of the first transmission path, wherein determining if the first transmission path is to be assigned to the Rake finger is further based on the at least one of the Signalto-Interference-plus-Noise Ratio of the first transmission path or the Signal-to-Noise Ratio of the first transmission path.

16. The Rake receiver circuit of claim 13, wherein the delay profile estimator is arranged upstream of the first unit.

17. The Rake receiver circuit of claim 13, further comprising:
   a Maximum Ratio Combiner arranged downstream of the second unit.

18. A Rake receiver circuit, comprising:
   a delay profile estimator configured to determine a delay profile associated with at least one of a pilot channel or a control channel;
   a Rake finger; and
   a unit configured to determine whether to assign a first transmission path of a first received signal received over a dedicated physical data channel to the Rake finger, wherein the determination is based at least in part on the delay profile of the received signal received over the dedicated physical data channel,
   wherein the determination is independent of at least one of a Signal-to-Noise ratio (SNR) or a Signal-to-Interference-plus-Noise Ratio (SINR) associated with the first transmission path when at least one of a first condition or a second condition is true, wherein the first condition is whether a difference between a first signal power of the first received signal and a second signal power of a second received signal received over the dedicated physical data channel via a second distinct transmission path is smaller than a predetermined threshold value, wherein the second condition is whether the first transmission path and the second distinct transmission path are received from a common radio cell,
   wherein the determination is based on at least one of the SNR or the SINR when neither the first condition nor the second condition are true.

* * * * *